United States Patent
Akazawa et al.

[11] Patent Number: 5,988,714
[45] Date of Patent: *Nov. 23, 1999

[54] BUMPER FASCIA FOR VEHICLE

[75] Inventors: Munehiko Akazawa; Yusuke Noda, both of Kanagawa-ken, Japan

[73] Assignee: Nissan Motor Co., Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/674,164

[22] Filed: Jul. 1, 1996

[30] Foreign Application Priority Data

Jul. 6, 1995 [JP] Japan .................................. 7-170907

[51] Int. Cl.⁶ .................................................. B60R 19/04
[52] U.S. Cl. ........................... 293/155; 293/143; 296/194
[58] Field of Search .................................. 293/155, 143; 362/80, 82, 523, 516, 520; 296/194, 206

[56] References Cited

U.S. PATENT DOCUMENTS

| | | | |
|---|---|---|---|
| 4,597,603 | 7/1986 | Trabert | 293/194 |
| 4,974,891 | 12/1990 | Furuta | 293/104 |
| 5,290,078 | 3/1994 | Bayer et al. | 293/120 |
| 5,388,037 | 2/1995 | Umeda et al. | 362/80 |
| 5,403,048 | 4/1995 | Ekladyous et al. | 293/115 |
| 5,431,464 | 7/1995 | Jones et al. | 293/121 |
| 5,566,057 | 10/1996 | Iwami | 362/80 X |
| 5,567,033 | 10/1996 | Tanaka et al. | 523/516 X |
| 5,580,109 | 12/1996 | Birka et al. | 293/120 |
| 5,603,561 | 2/1997 | Ohishi | 362/80 |
| 5,688,044 | 11/1997 | Watanabe et al. | 362/516 |

FOREIGN PATENT DOCUMENTS

61-196848  1/1986  Japan .................................. 293/155

*Primary Examiner*—D. Glenn Dayoan
*Assistant Examiner*—Jason Morrow
*Attorney, Agent, or Firm*—Foley & Lardner

[57] ABSTRACT

A bumper fascia is provided for a vehicle having head lamps and an armature positioned under the head lamps. Over the whole width of the vehicle, the bumper fascia is arranged along respective lower edges of the head lamps. Each head lamp includes a lamp housing and a lamp lens. The bumper fascia includes an upper and rear end portion and extensions formed in a part of the upper and rear end portion so as to extend up to an attachment part where the lamp lenses are connected to the lamp housings. In assembly, the extensions are mounted on the armature. Owing to the extensions formed on the underside of the lamp lenses, it is unnecessary to paint the under face of each lamp lens black. Since a top of the armature is hidden by the extensions, it is also unnecessary to paint the armature black.

6 Claims, 7 Drawing Sheets

BUMPER FASCIA FOR VEHICLE

BACKGROUND OF THE INVENTION

1. Technical Field

The present invention relates to a bumper fascia for a vehicle. More particularly, it relates to an improvement of a part of the bumper fascia, which is positioned beneath a pair of head lamps of the vehicle.

2. Description of the Prior Art

Figure 1:
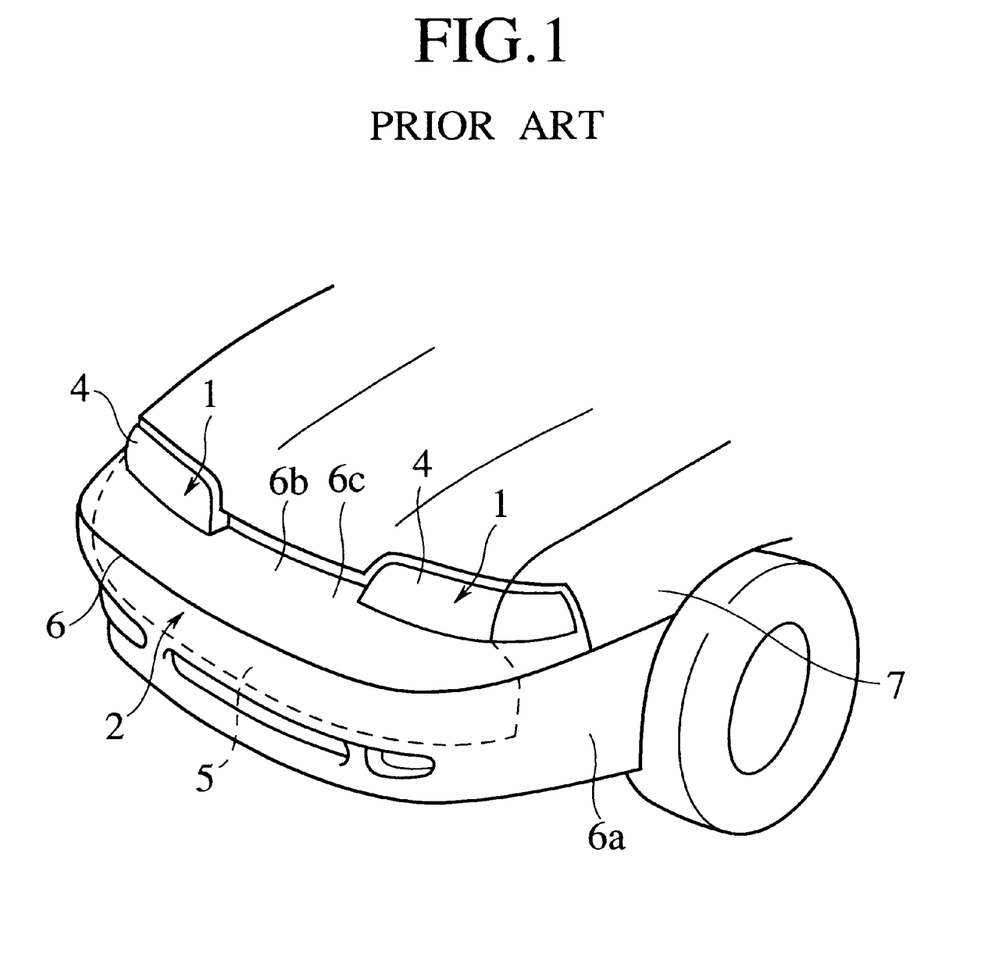
FIG. 1 is a perspective view showing a front section of the conventional vehicle.

An example of the prior art front bumper structure as shown in FIGS. 1, 2, 3, 4A, 4B, and 4C. In FIG. 1, reference numerals 1, 1 designate a pair of head lamps arranged on a front end of the vehicle. Under the head lamps 1, 1, a front bumper 2 extends along a width direction of the vehicle.

Figure 2:
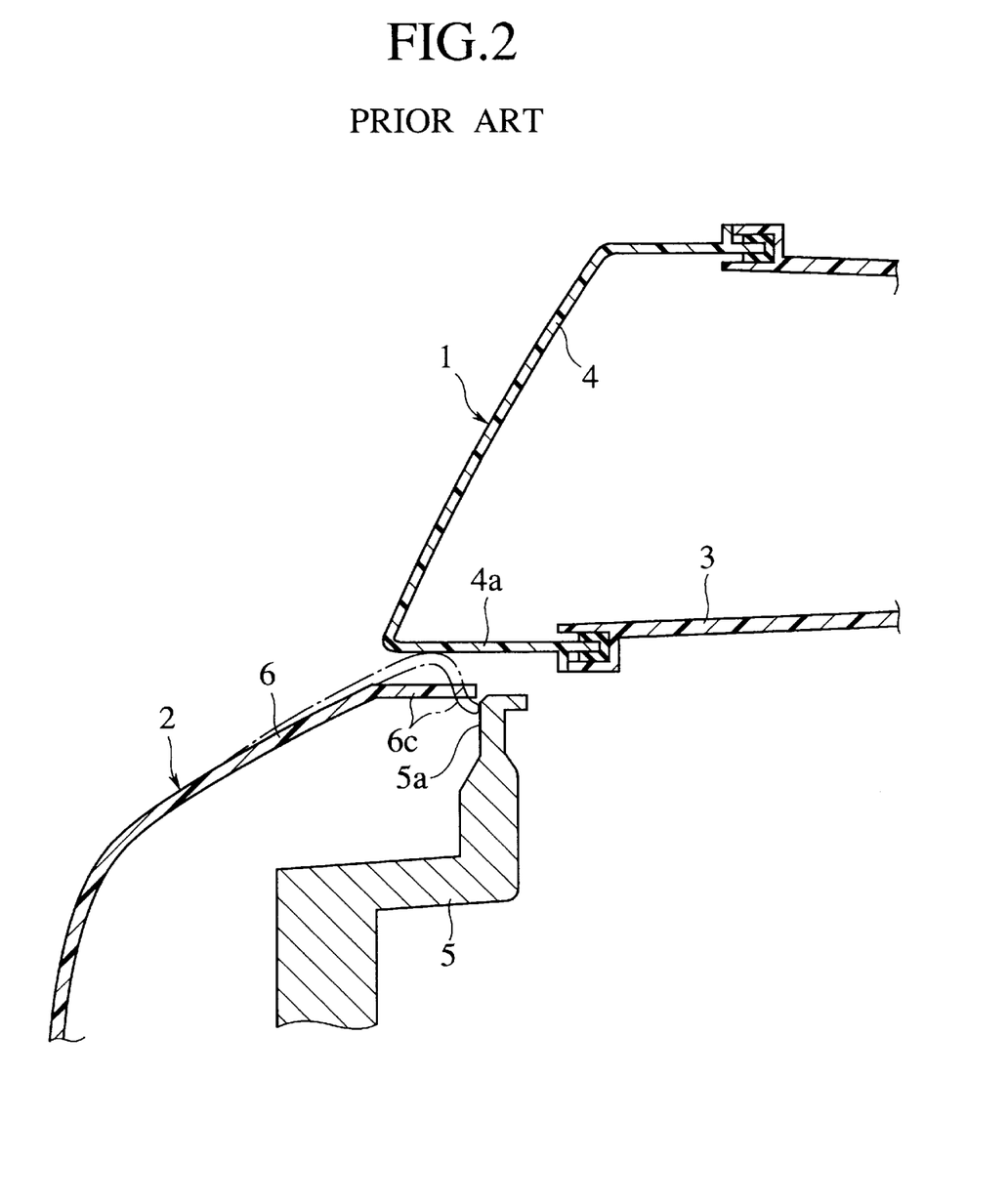
FIG. 2 is a cross sectional view showing a conventional bumper fascia of the vehicle, taken along back and forth directions thereof.

As shown in FIG. 2, each of the head lamps 1 includes a lamp housing 3, which houses light bulbs (now shown) and a lamp lens 4, which is attached to leading ends of the lamp housing 3.

In the front bumper 2, an armature 5 extending over the substantial whole width of the vehicle is fixed to a front end of a front side member (not shown) as reinforcement through the intermediary of a bumper stay (also not shown). A bumper fascia 6 of synthetic resin as a part of the front bumper 2 is positioned to cover the armature 5.

Figure 3:
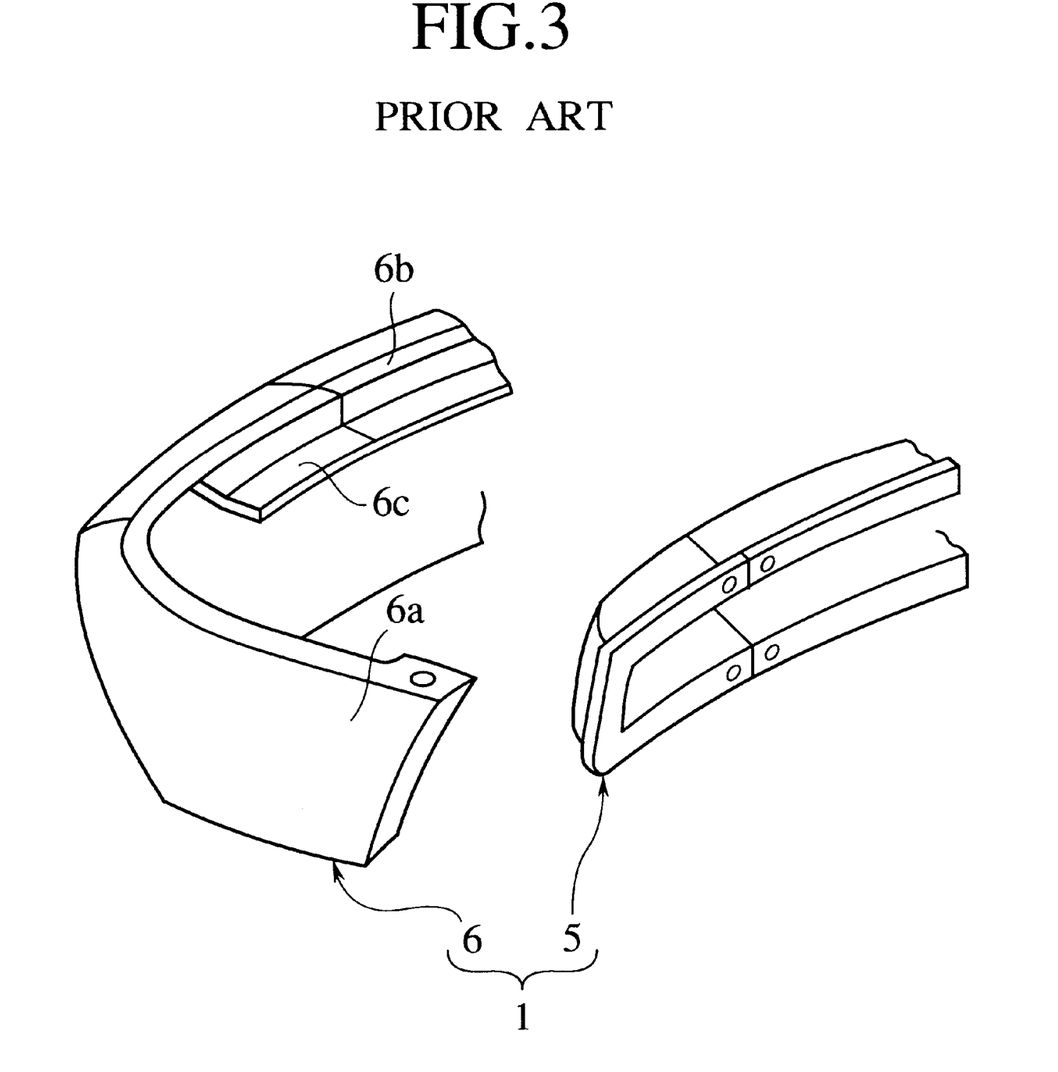
FIG. 3 is a perspective view showing the conventional bumper fascia and an armature.

As shown in FIGS. 1 and 3, the bumper fascia 6 is adapted in a manner that respective side portions 6a extend up to lateral sides of the vehicle and are attached to front fenders 7 while a central part 6b is attached to the armature 5.

Note that, this kind of bumper structure is also disclosed in Japanese Unexamined Utility Model Publication No. 3-49143.

In the above-mentioned conventional bumper structure, however, if a top end of the armature 5 is visible from the front of the vehicle through under faces 4a of the lamp lenses 4, the vehicle's appearance quality would be damaged and a so-called "glare" effect would be caused by reflection of light from the top end of the armature 5. Therefore, conventionally, there has been taken a countermeasure to paint the under faces 4a of the lamp lenses 4 black in order to put the top end out of sight and to prevent an occurrence of the "glare" effect. Consequently, such a painting operation is troublesome for a manufacturer and simultaneously, the manufacturing cost of the vehicle itself will be increased.

Further, when the vehicle collides lightly, an upper and rear end portion 6c of the bumper fascia 6 will collide with a vertical face 5a of the armature 5 to deform upwardly, as shown with the single-dotted lines of FIG. 2. Consequently, the bumper fascia 6 will interfere with the lamp lens 4.

Figure 4A:
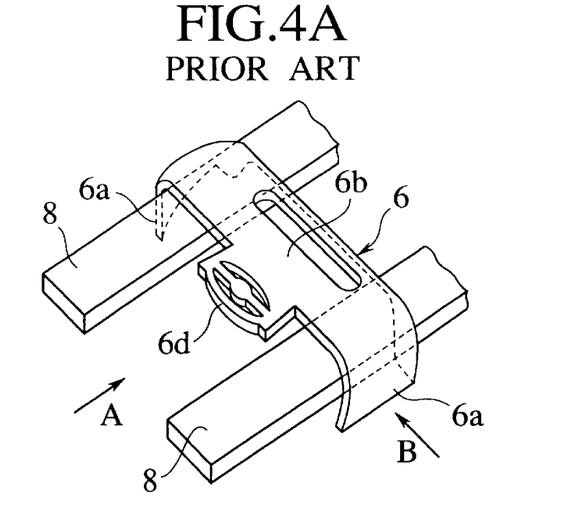
FIG. 4A is a perspective view showing the conventional bumper fascia in process of being transferred on a pair of conveyers.
Figure 4B:
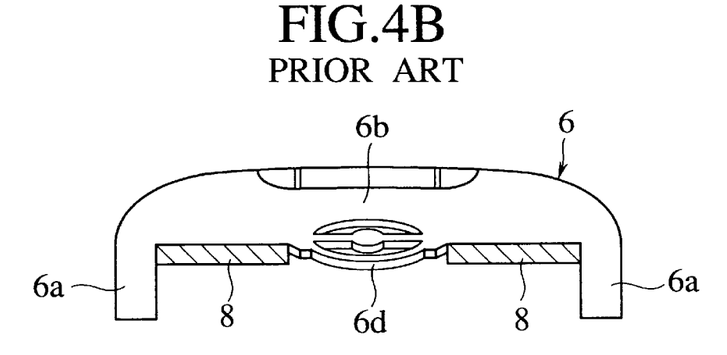
FIG. 4B is a diagram of the conventional bumper fascia and the conveyers, viewed in a direction of arrow A of FIG. 4A.
Figure 4C:
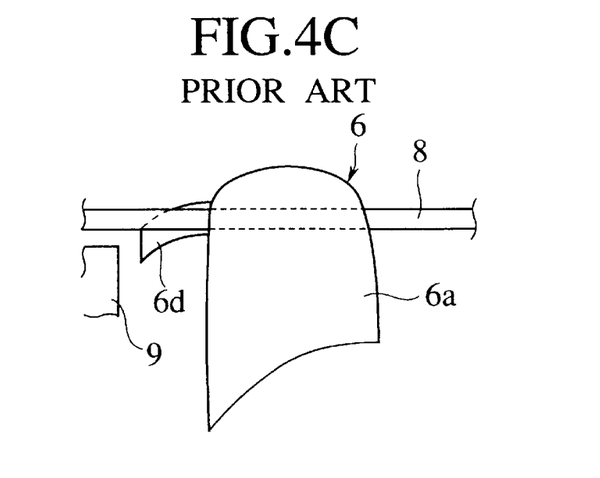
FIG. 4C is a diagram of the conventional bumper fascia and the conveyers, viewed in a direction of arrow B of FIG. 4A.

Additionally, in such a bumper fascia as shown in FIGS. 4A, 4B and 4C where a grill portion 6d thereof is formed on the upside of a central part 6b in one body, when it is transferred by a pair of conveyers 8, 8, the grill portion 6d projects downwardly between the pair of conveyers 8, 8, so that the grill portion 6d may interfere with another member 9, as shown in FIG. 4C. Further, in case of painting the bumper fascia 6 while being transferred, there will be a problem in that it is impossible to paint the grill portion 6d sinking between the pair of conveyers 8, 8. In particular, since both side edges of the grill portion 6d are hidden by the conveyers 8, 8, they may not become painted.

SUMMARY OF THE INVENTION

It is therefore an object of the present invention to provide a bumper fascia for a vehicle, that does not require the lamp lens to be painted black and which is capable of preventing the lamp lenses from being damaged even when a light collision is caused at a front section of the vehicle.

Another object of the invention is to provide a bumper fascia in which a grill portion thereof does not collide with another member in even a case of transporting and which makes it possible to paint the grill portion even when the bumper fascia is mounted on the conveyers.

The object of the present invention described above can be accomplished by a bumper fascia for a vehicle having head lamps and an armature positioned under the head lamps, the bumper fascia being arranged along respective lower edges of the head lamps and arranged over the whole width of the vehicle, each of the head lamps having a lamp housing and a lamp lens, which is attached to a front part of the lamp housing at an attachment part of the head lamp, the bumper fascia comprising:

an upper and rear end portion having a part positioned below the head lamps; and extensions, each of which is formed in the part of the upper and rear end portion so as to extend up to the attachment part, wherein the extensions are mounted on the armature.

With the arrangement mentioned above, since each extension is formed on the underside of the lamp lens so as to extend up to the attachment part, it is unnecessary to paint the under face of each lamp lens black, different from the conventional bumper fascia. In addition, since a top of the armature is invisible from the outside, it is also unnecessary to paint the armature black. Therefore, because of no need for black-painting, the workability can be improved while the manufacturing cost of the vehicle can be reduced.

Moreover, different from the conventional bumper fascia, even if a front section of the vehicle has a light collision, the upper and rear end portion would not bump against a vertical wall of the armature because of the above arrangement where the extensions are mounted on the armature. Therefore, it is possible to prevent the upper and rear end portion from being deformed upwardly, so that the head lamps is not injured.

In the present invention, preferably, the extensions are not subjected to painting. In this case, since the extensions are normally tinged with black or deep gray as base material's color, no reflection is caused from the extensions, so that an occurrence of so-called "glare" effect can be prevented.

More preferably, the bumper fascia of the invention further comprises a projecting radiator grill portion arranged on the upside of the bumper fascia's center in the direction of the vehicle's width and the extensions are arranged on both sides of the projecting radiator grill portion. With this arrangement that bumper fascia includes, when the bumper fascia is transferred on a pair of conveyers while being painted in manufacturing processes, the extensions on both sides of the projecting radiator grill portion are brought into contact with the conveyers, so that the projecting radiator grill portion will be raised above respective top faces of the conveyers. Thus, under such a condition, the radiator grill portion does not project from conveyers downwardly, so that the collision against another can be prevented. Furthermore, it is possible to paint the radiator grill portion while the bumper fascia is mounted on the conveyers.

In the above-mentioned arrangement, it is more preferable that a projecting length of each of the extensions is larger than a projecting length of the projecting radiator grill portion. In this case, since the projecting radiator grill portion is positioned higher than the top faces of the conveyers, the arrangement enables respective side edges of the projecting radiator grill portions to be painted without omission in painting.

The above and other features and advantages of this invention will become apparent, and the invention itself will best be understood, from a study of the following description and appended claims, with reference had to the attached drawings showing a preferred embodiment of the invention.

DESCRIPTION OF THE PREFERRED EMBODIMENT

An embodiment of the present invention will be described with reference to the drawings.

FIGS. 5 to 7C show a bumper fascia in accordance with the embodiment of the present invention. Note, in this embodiment, elements similar to those in the above-mentioned conventional bumper fascia are indicated with the same reference numerals, respectively.

Figure 5:
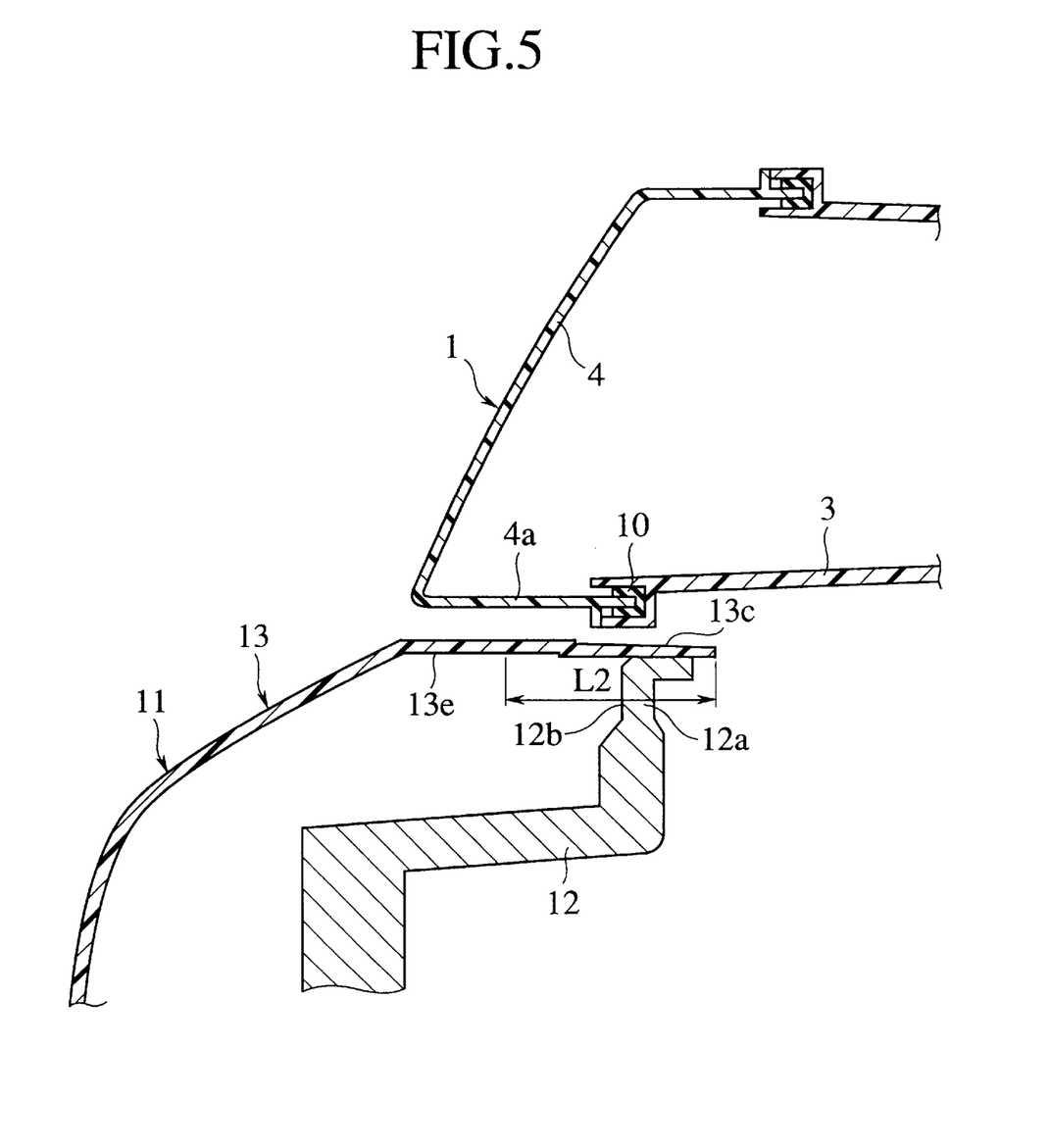
FIG. 5 is a cross sectional view showing a bumper fascia in accordance with an embodiment of the present invention, taken along the front to back direction of the vehicle.

That is, reference numeral 1 designates a head lamp arranged on the front side of the vehicle. Under the head lamp 1, a front bumper 11 is attached to extend direction of the vehicle.

As shown in FIG. 5, the head lamp 1 includes a lamp housing or shield, which houses bulbs (not shown) are arranged and a lamp lens 4 attached to the front of the lamp housing 3.

In the front bumper 11, an armature 12, which extends over the substantial whole width of the vehicle is fixed on a front end of a front side member (not shown) as reinforcement through the intermediary of a bumper stay (also not shown). A bumper fascia 13 of synthetic resin is arranged to cover the armature 12.

Figure 6:
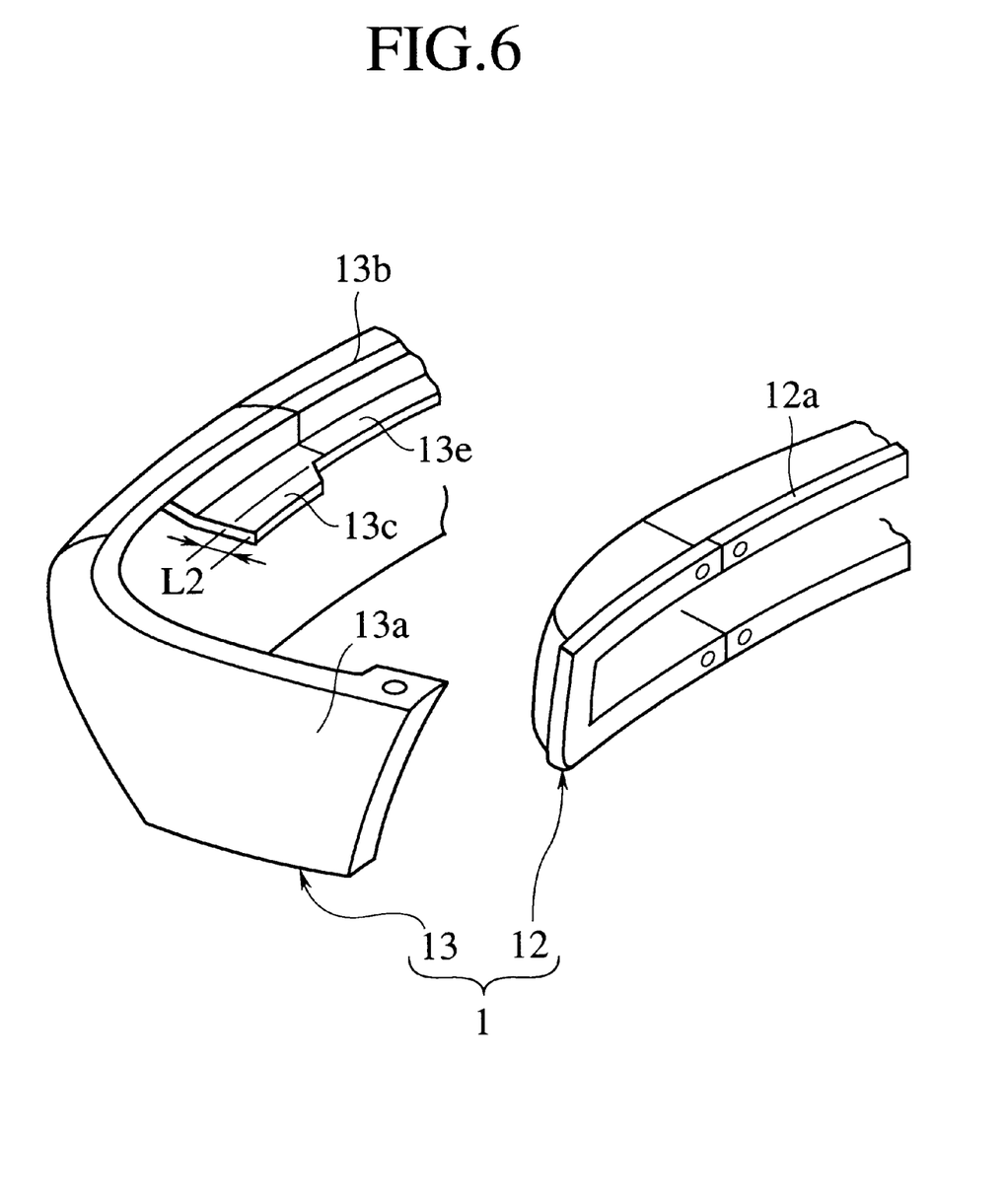
FIG. 6 is a perspective view showing the bumper fascia of FIG. 5 and the armature in an exploded condition.

As representatively shown in FIG. 6, the bumper fascia 13 is adapted in a manner that each side part 13a thereof extends up to a lateral side of the vehicle and is attached to a front fender while a central part 13b in the vehicle's width direction is attached to the armature 12.

In FIGS. 5 and 6, the bumper fascia 13 includes an upper and rear end portion 13e provided under the head lamp 1 with extensions or shield portions 13c. Each of the extension 13c is adapted so as to extend up to an attachment part 10 where the lamp lens 4 is attached to the lamp housing 3. The extension 13c is adapted to be mounted on a top 12a of the armature 12.

The bumper fascia 13 is subjected to painting with a predetermined color while leaving the black or gray extensions 13c unpainted.

Figure 7A:
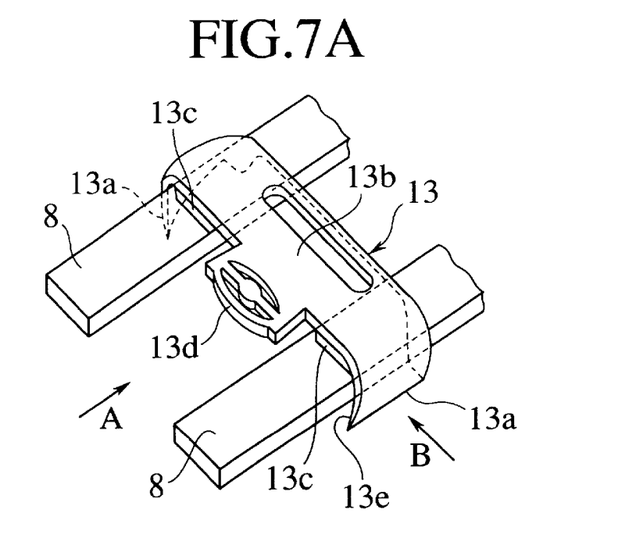
FIG. 7A is a perspective view showing the bumper fascia of FIG. 5 in process of being transferred on the conveyers.
Figure 7B:
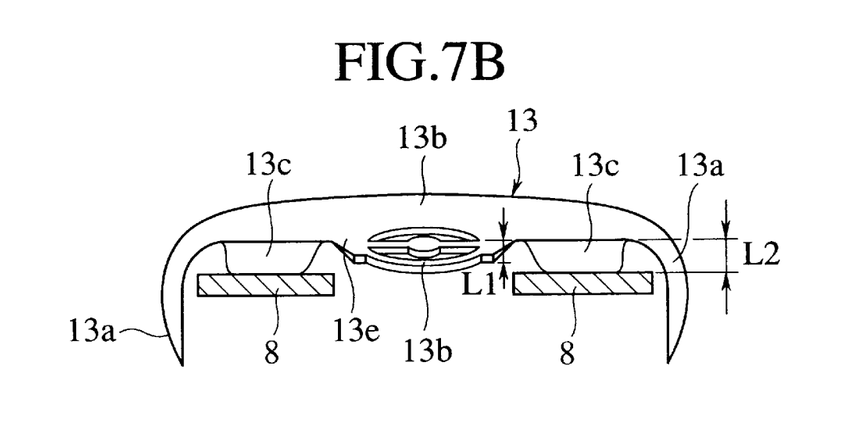
FIG. 7B is a diagram of the bumper fascia and the conveyers, viewed in a direction of arrow A of FIG. 7A.

As shown in FIG. 7A, the bumper fascia 13 is provided on the upper side of the central part 13b with a radiator grill portion 13d, which is to be positioned in front of a radiator (not shown). The above-mentioned extensions 13c are arranged on both sides of the radiator grill portion 13d. As shown in FIG. 7B, a length L1 of the radiator grill portion 13d in the front to back direction of the vehicle is established to be smaller than a length L2 of each extension 13c in the same direction.

The bumper fascia mentioned above operates as follows.

According to the embodiment, since the extensions 13c are arranged on the underside of the under face 4a of the lamp lens 4 to extend up to the attachment part 10, it is unnecessary to paint the under face 4a black, different from the conventional bumper fascia. Further, it is possible to prevent an occurrence of "grayer" effect since the armature top 12a is invisible from the outside while there is no reflection from the extensions 13c. Therefore, because of no need for black-painting, the workability can be improved while the manufacturing cost can be reduced.

Different from the conventional bumper fascia, even if a front section of the vehicle has a light collision, since the extensions 13c are mounted on an upper part 12a of the armature 12, the upper and rear end portion 13e would not bump against a vertical wall 12b of the armature 12. Therefore, it is possible to prevent the upper and rear end portion 13e from being deformed upwardly, so that the head lamps 1 is not injured at all.

Figure 7C:
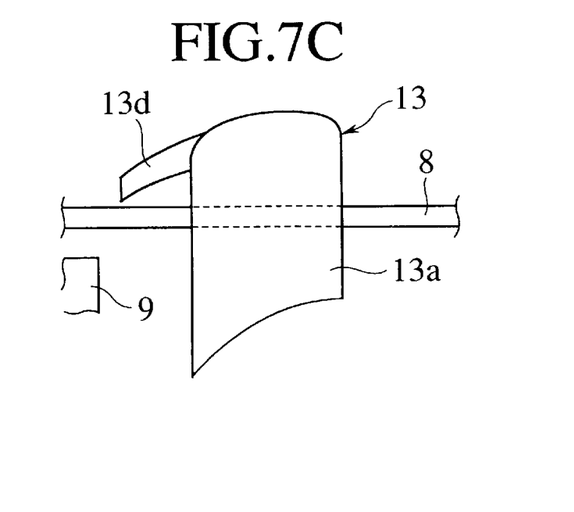
FIG. 7C is a diagram of the bumper fascia and the conveyers, viewed in a direction of arrow B of FIG. 7A.

On the other hand, as shown in FIGS. 7A, 7B and 7C, when the bumper fascia 13 is transferred on a pair of conveyers 8, 8 while being painted in manufacturing processes, the extensions 13c, 13c on both sides of the projecting radiator grill portion 13d are brought into contact with the conveyers 8, 8 and raised above the top faces of the conveyers 8, 8. This is because the length L1 of the radiator grill portion 13d is smaller than the length L2 of the extensions 13c. Under such a condition, the radiator grill portion 13d does not project from the conveyers 8, 8 downwardly, so that the interference of the portion 13d with another member 9 can be prevented as shown in FIG. 7C. Furthermore, it is possible to paint the radiator grill portion 13d while the bumper fascia 13 is mounted on the conveyers 8, 8.

Particularly, since the projecting radiator grill portion 13d is positioned higher than the top faces of the conveyers 8, 8, the arrangement enables respective side edges of the projecting radiator grill portion 13d to be painted.

Finally, it will be understood by those skilled in the art that the foregoing description is preferred embodiments of the disclosed bumper fascia, and that various changes and modifications may be made to the present invention without departing from the spirit and scope thereof.

What is claimed is:

1. A bumper for a vehicle having a head lamp, which includes a lamp shield and a lamp lens extending in front of the lamp shield, the bumper comprising:

an armature member adapted to be mounted vertically opposing the head lamp; and a fascia member mounted to the armature member, wherein the fascia member has a shield portion adapted to extend substantially horizontally between the lamp lens and the armature member, and a radiator grill integrally formed on an upper side of a central portion of the fascia member, the shield portion being adapted to extend beyond the lamp lens to underneath the lamp shield, wherein the radiator grill is rearwardly raked relative to the central portion thereof and extends rearwardly by a first length, wherein the fascia member includes a pair of the shield portions, which are laterally spaced, with the radiator grill formed between the shield portions, and wherein the shield portion extends rearwardly by a second length that is larger than the first length.

2. The bumper according to claim 1, wherein the shield portion has a first part and an unpainted second part rearwardly extending from and integral with the first part.

3. A vehicle comprising:

a headlamp, which includes a lamp shield and a lamp lens extending in front of the lamp shield;

an armature member positioned below the head lamp, vertically opposing the head lamp; and a fascia member mounted to the armature member, wherein:

the fascia member has a shield portion that extends substantially horizontally between the lamp lens and the armature member, and a radiator grill integrally formed on an upper side of a central portion of the fascia member, the shield portion extends beyond the lamp lens to underneath the lamp shield, the radiator grill is rearwardly raked relative to the central portion thereof and extends rearwardly by a first length, the fascia member includes a pair of the shield portions, which are laterally spaced, with the radiator grill formed between the shield portions, and the shield portion extends rearwardly by a second length that is larger than the first length.

4. The vehicle according to claim 3, wherein the lamp lens has a transparent under face part, and the shield portion is locally painted, leaving an unpainted part facing the transparent under face part of the lamp lens.

5. A bumper and head lamp assembly for a vehicle, comprising:

a head lamp comprising a lamp shield and a lamp lens extending in front of the lamp shield; and a bumper comprising an armature member mounted vertically opposing the head lamp, and a fascia member mounted to the armature member, wherein:

the fascia member has a shield portion extending substantially horizontally between the lamp lens and the armature member, and a radiator grill integrally formed on an upper side of a central portion of the fascia member, the shield portion extends beyond the lamp lens to underneath the lamp shield, the radiator grill is rearwardly raked relative to the central portion thereof and extends rearwardly by a first length, the fascia member includes a pair of the shield portions, which are laterally spaced, with the radiator grill formed between the shield portions, and the shield portion extends rearwardly by a second length that is larger than the first length.

6. The assembly according to claim 5, wherein the lamp lens has a transparent under face part, and the shield portion is locally painted, leaving an unpainted part facing the transparent under face part of the lamp lens.

* * * * *